(12) United States Patent
Beamer et al.

(10) Patent No.: US 7,051,760 B1
(45) Date of Patent: May 30, 2006

(54) THREE-WAY INLINE PIGGABLE BRANCH VALVE

(76) Inventors: Ralph Lewis Beamer, 30W744 Woodewind Dr., Naperville, IL (US) 60563; Richard Carl Andersen, 2097 Vermont St., Rolling Meadows, IL (US) 60008

( * ) Notice: Subject to any disclaimer, the term of this patent is extended or adjusted under 35 U.S.C. 154(b) by 176 days.

(21) Appl. No.: 10/769,329

(22) Filed: Jan. 30, 2004

(51) Int. Cl.
*F16K 11/10* (2006.01)

(52) U.S. Cl. .................... 137/625.47; 137/244

(58) Field of Classification Search ........... 137/625.47, 137/244; 134/8, 22.11
See application file for complete search history.

(56) References Cited

U.S. PATENT DOCUMENTS

| | | | | |
|---|---|---|---|---|
| 2,786,219 A | * | 3/1957 | Meyer | 15/104.062 |
| 3,177,513 A | * | 4/1965 | Ellett | 15/104.062 |
| 3,283,354 A | * | 11/1966 | Simmons | 15/104.062 |
| 3,473,550 A | * | 10/1969 | Ford, Jr. et al. | 137/268 |
| 3,580,539 A | * | 5/1971 | Van Scoy | 251/159 |
| 4,016,621 A | * | 4/1977 | Slegers et al. | 15/104.062 |
| 4,073,303 A | * | 2/1978 | Foley, Jr. | 137/15.07 |
| 4,317,486 A | * | 3/1982 | Harris | 166/250.04 |
| 5,133,895 A | | 7/1992 | Ogawa et al. | |
| 5,193,572 A | | 3/1993 | Le Devehat | |
| 5,277,248 A | * | 1/1994 | Breland | 166/70 |
| 6,079,074 A | * | 6/2000 | Ellett | 15/104.062 |

OTHER PUBLICATIONS

OPW Engineered Systems, catalog cut T09.0.0, copyright 1988 Dover Corporation/OPW Division—Tee-Ring Valve (copy attached—2 pgs).
FMC Corporation, catalog cut, FMC-Inline Distribution Ball Valve, Nov. 10, 1990 (copy attached—1 pg).

* cited by examiner

*Primary Examiner*—John Fox

(57) ABSTRACT

A multi-port valve device to divert flow of a fluid from a piggable transfer pipe line into a branch pipeline, and simultaneously prevent a line clearing device (known as a pig or cleaning sphere) from flowing with that fluid into the branch pipeline. This device can operate in a least two positions; one that will allow unobstructed flow of a fluid and/or pigs through the device, and at least one other position that will divert flow of a fluid through the device to a branch port and simultaneously present an in-line barrier to stop a pig. In a preferred embodiment, the device resembles a customized "T-port" ball valve where the "branch" flow path is modified to include an integral pig stop.

9 Claims, 4 Drawing Sheets

THREE-WAY INLINE PIGGABLE BRANCH VALVE

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND

1. Field of Invention

This invention relates generally to the field of industrial pipeline pigging and more specifically to a device that can simultaneously control the flow path as a fluid enters or leaves a piggable pipeline, as well as the movement of pigs within the piggable pipeline.

2. Description of Prior Art

Pigging is used in industrial applications to clean, scrape or purge piping systems. Components used in these applications are engineered to launch, catch and control the movement of special in-line clearing devices called pigs. The pigs are moved through the inside of the piping systems using propellants such as compressed air, inert gases, or pumped fluids. Pigs can resemble spheres, cylinders, or other shapes and can be equipped with a variety of features to enhance their cleaning function; such as wire brushes, abrasive materials, scrapers, or squeegee-like blades. As a pig is propelled through the pipeline, its surface is used to physically clean or scrape the inside of the pipeline to remove unwanted debris or sediment, or to ensure that any material present in the pipeline is "pushed" downstream by the pig. Cleaning efficiencies can vary with pig design, pipeline design, and the speed at which the pig is propelled through the pipeline.

An important application of pigging technology can be found where a common distribution pipeline is used to supply multiple destinations. In these systems, various fluid products may be produced in one or more mixing tanks and then pumped via a common distribution pipeline to predetermined destination tanks. Points along the distribution pipeline where fluid flows into, or out of, the pipeline are called branch points. For a given transfer, a fluid would be pumped into the distribution pipeline at a predetermined branch point and then discharged downstream from a second predetermined branch point. The pigging operation should ensure that sections of the pipeline not needed for the transfer, upstream of the entry point and downstream of the discharge point, are blocked off and that all of the fluid pumped into the line is efficiently discharged from the line. Once the pigging operation is complete, any fluid remaining in the pipeline is a potential source of cross contamination for subsequent transfers.

Hence, the device or devices used at each branch point must control fluid flow into and/or out of the distribution pipeline, create upstream and downstream seals in the pipeline during the transfer, allow a pig to traverse the section of pipeline used for the transfer and provide a means to stop the pig at the discharge branch point with minimum fluid retention. Common devices used to meet this requirement fall into two categories: (1) Piggable Tee and Line Block and (2) Branch Valve and Pig Stop.

(1) Piggable Tee and Line Block Category:

In this category piggable tees and piggable ball valves are installed in the distribution pipeline at branch points and block valves are installed in the branch pipelines as close as possible to the distribution pipeline. The piggable tees in the distribution pipeline are constructed with internal guides to prevent a pig from following the fluid flow from the distribution pipeline into a branch pipeline. The ball valves in the distribution pipeline are used to control pig movement and provide seals downstream of the transfer operation. The block valves in the branch pipelines are operated to control flow to and from the distribution pipeline. When a product transfer is complete a pig is launched toward the branch discharge point to expel fluid from the distribution pipeline into the branch pipeline. The Piggable ball valve in the distribution pipeline creates a seal downstream of the branch point to stop the pig and to divert fluid flow into the branch pipeline. The piggable tee allows the fluid to flow into the branch pipeline and prevents the pig from following. The piggable tees used in this approach have the disadvantage of forming pockets at each branch point that trap and retain fluid after each transfer operation. This retained fluid can be a potential source of cross contamination for subsequent transfers. The amount of retention can be minimized through strategic orientation of the piggable tees with respect to the distribution pipeline, but it cannot be eliminated. Three devices are required at each branch point to implement this approach; (1) a piggable tee in the piggable transfer line, (2) a piggable valve in the piggable transfer line, and (3) a block valve in the branch pipeline.

(2) Branch Valve and Pig Stop Category (There are at least two devices commercially available that fall into this category.)

In this category a single device incorporates the functions of the piggable tee and the block valve in the branch pipeline, and also provides a retractable pig stop in the distribution pipeline. These devices utilize two pigs in the distribution pipeline, one upstream and one downstream of the transfer operation. Retractable pig stops (steel rods of suitable size or other shapes) are inserted into the pipeline to control pig movement. After a product transfer is complete, a pig stop is inserted at the branch discharge point and the upstream pig is launched to "push" remaining fluid toward the branch discharge point. Any fluid in the pipe line upstream of the branch discharge point is expelled at the branch discharge point as the pig comes to rest against the upstream side of the pig stop. The downstream pig is launched toward the pig stop from a point downstream of the branch discharge point. Any fluid downstream of the branch discharge point is similarly expelled as the pig comes to rest against the downstream side of the pig stop. In this way, only the small quantity of fluid trapped around at the pig stop between the opposing pigs is left in the pipeline.

These devices have the disadvantage of requiring the use of two pigs in the distribution pipeline, which complicates the pigging operation, can increase the cost and complexity of the pig launchers, and increases the cost of system programming (if automated). Also as the pigs wear, their ability to form positive seals in the piggable transfer line is degraded. Worn pigs can allow the propellant to leak around the pigs during the transfer operation and thus become entrained in the fluid being transferred.

Industrial applications of piggable systems often include automation of system components. While the two categories discussed above incorporate components that are easily automated, they have the disadvantage of requiring multiple components. It can be appreciated that cost of actuators, limit switches, signal wiring, programming time, and field installation will increase with the number of components that must be automated. And since use of the present invention will facilitate an approach requiring only one component per branch point, the cost of system automation will be significantly reduced.

SUMMARY OF THE INVENTION

The primary object of the invention is to provide an efficient and robust means of controlling pig movement to a branch point in a piggable transfer line while minimizing product retention in the transfer line after completion of the pigging operation.

Another object of the invention is to provide a positive seal in the piggable transfer line to isolate the transfer operation from the balance of the transfer line, without requiring the use of a second pig.

Another object of the invention is to control fluid flow into, or out of, a piggable transfer line at a branch point and to direct or divert that flow to or from a predetermined region of the main transfer line; upstream, downstream, or both.

Yet another object of the invention is to ensure that it can be operated manually, but easily and cost-effectively automated if desired.

Still another object of the invention is to simultaneously perform the functions of three standard devices; (A) a piggable tee in the piggable transfer line, (B) a piggable valve in the piggable transfer line, and (C) a block valve in the branch pipeline.

Other objects and advantages of the present invention will become apparent from the following descriptions, taken in connection with the accompanying drawings, wherein, by way of illustration and example, an embodiment of the present invention is disclosed.

For this purpose the present invention is a device which can operate in a number of positions that include at least one position which will allow unobstructed flow of a fluid and movement of line-clearing devices through said device and at least one alternate position which will divert flow of said fluid through said device to a branch port and simultaneously present an in-line barrier to control the movement of said line-clearing devices commonly known as pigs, spheres, swabs, squeegees, scrapers or dumb bells. The preferred embodiment of the invention is comprised of a multi-port ball valve body with three ports in the same plane, and a ball customized to incorporate an integral pig stop. For fluid flow control, the customized ball performs like a common "T-Port" ball, but also serves as a pig stop when set in the branch position.

BRIEF DESCRIPTION OF THE DRAWINGS

Drawing Figures

The drawings constitute a part of this specification and include exemplary embodiments to the invention, which may be embodied in various forms. It is to be understood that in some instances various aspects of the invention may be shown exaggerated or enlarged to facilitate an understanding of the invention.

REFERENCE NUMERALS IN DRAWINGS

101 Valve Body

102 Main Line Port (Upstream)

103 Main Line Port (Downstream)

104 Branch Port

105 Pig

106 Ball Element

107 Inert Cavity Filler

108 Machined Holes

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The preferred embodiment of the present invention is a multi-port valve device to control fluid flow and movement of inline clearing devices in a piping application that can operate in a plurality of predetermined positions that include at least one position which will allow unobstructed flow of said fluid and said clearing devices through said device and at least one alternate position which will divert flow of said fluid through said device to a branch port and simultaneously present an in-line barrier to control the movement of said line-clearing devices selected from the group consisting of pigs, spheres, swabs, squeegees, cylinders, and balls comprising; a multi-port valve body with at least three ports in the same plane; a rotating core member to control flow direction through said valve body comprising; at least one unobstructed flow path through said member and at least one partially obstructed branch path through said member which can divert flow of a fluid through said member while said partial obstruction serves as an in-line stop for said line-clearing devices; and a means to rotate said core member about an axis perpendicular to said plane whereby said paths through said core member can be made to align with predetermined ports of said valve body.

The preferred embodiment of the invention is illustrated in FIGS. 1 through 7, and in practice resembles a customized full-flow T-port ball valve. The device can be made by machining four appropriately sized and spaced holes in the ball element of a full-port 2-way ball valve, in such a way that the modified ball can be used to replace a full flow "T-Port" ball element in a 3-way ball valve body. The machined holes in the customized ball serve as a branch path to permit flow of a fluid through the ball, and the material left between the holes serves as an in-line pig stop.

Figure 1:
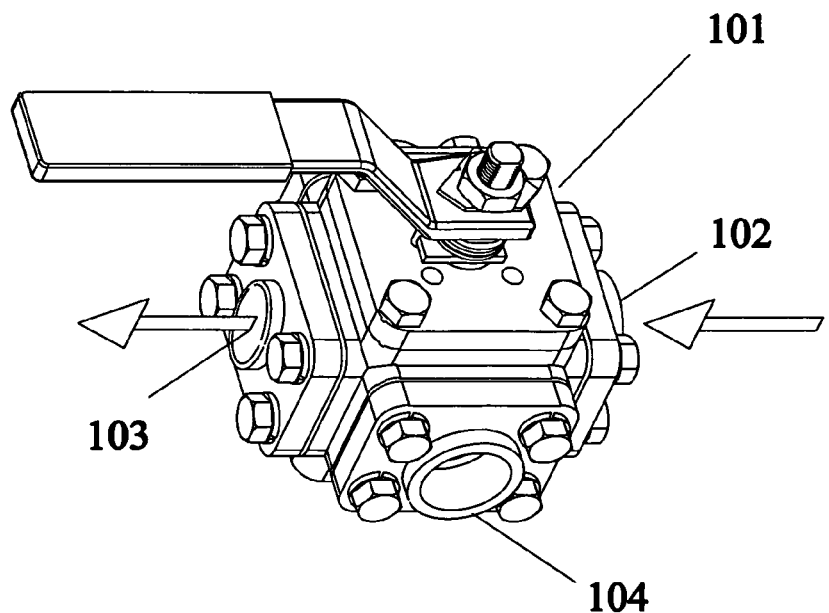
FIG. 1 is a perspective view of the invention set in the "through" flow position.
Figure 2:
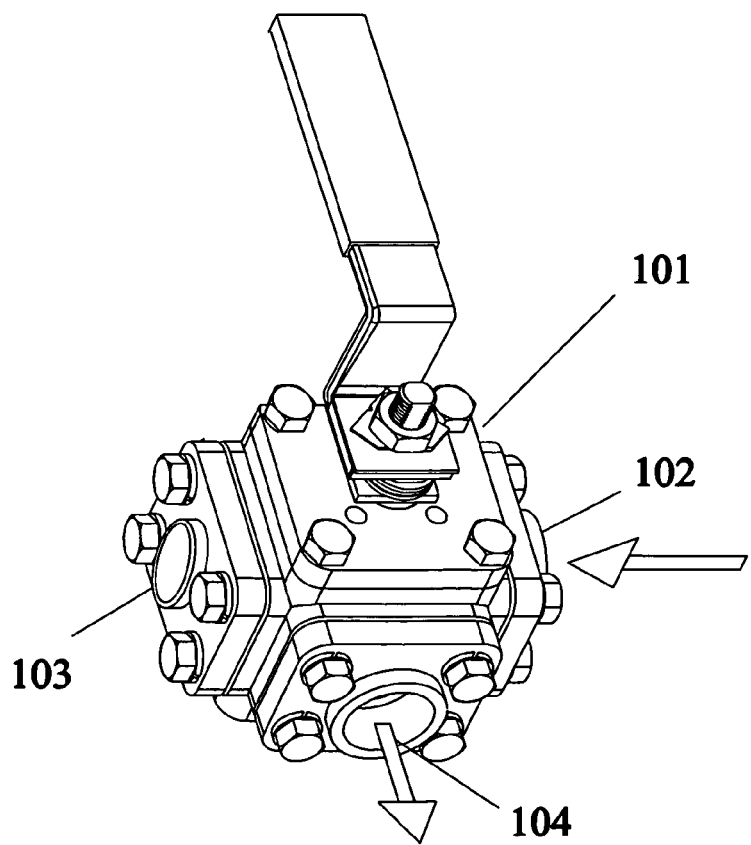
FIG. 2 is a perspective view of the invention set in the "branch" flow position.

Turning to FIGS. 1 and 2 one can see perspective views of the valve in two positions. FIG. 1 shows the valve body 101 with the valve set in the "through" flow position. Flow is depicted with arrows as entering the main line port 102 and leaving the main line port 103, with the branch port 104 blocked. FIG. 2 shows the valve body 101 with the valve set in the "branch" flow position. Flow is depicted with arrows as entering the main line port 102 and leaving branch port 104, with main line port 103 blocked.

Figure 3:
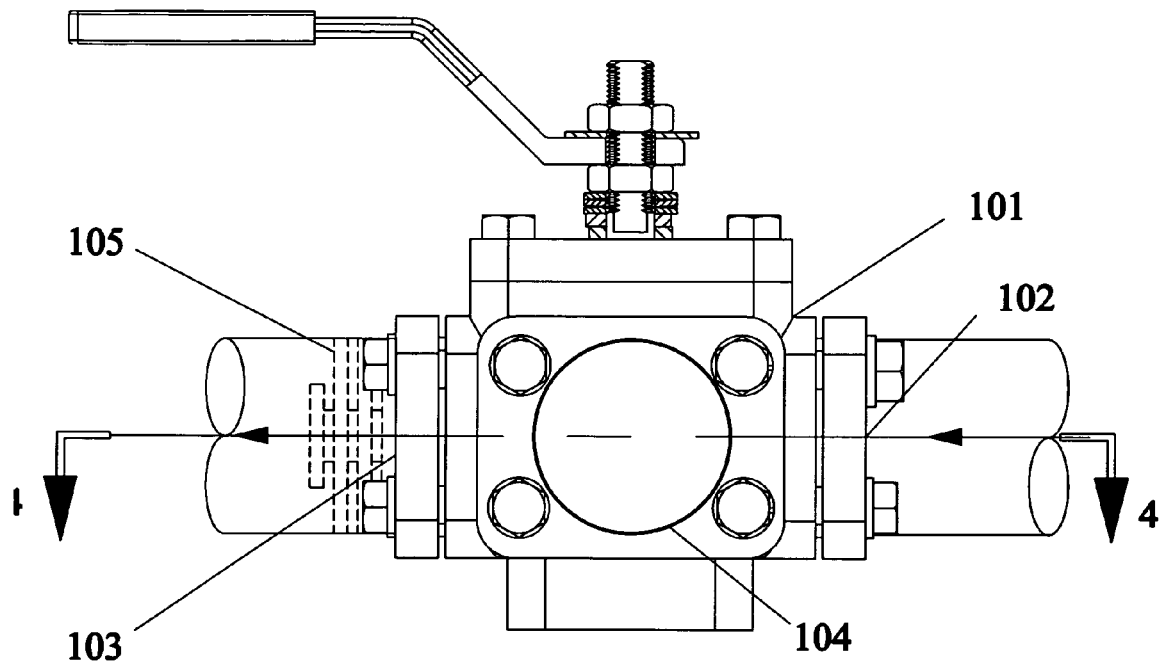
FIG. 3 is an elevation view of the invention set in the "through" flow position, looking into the branch port.

FIG. 3 is an elevation view of the invention looking directly into the branch port 104 and showing the valve body 101 with the valve set in the "through" flow position. Flow is depicted with arrows as entering the main line port 102, and leaving the main line port 103, with the branch port 104 blocked. Portions of upstream piping connected to the main line port 102 and downstream piping connected to the main line port 103 are shown in outline form for clarity. A portion of a pig 105 is shown emerging from the valve body 101 and entering the downstream piping connected to the main line port 103.

Figure 4:
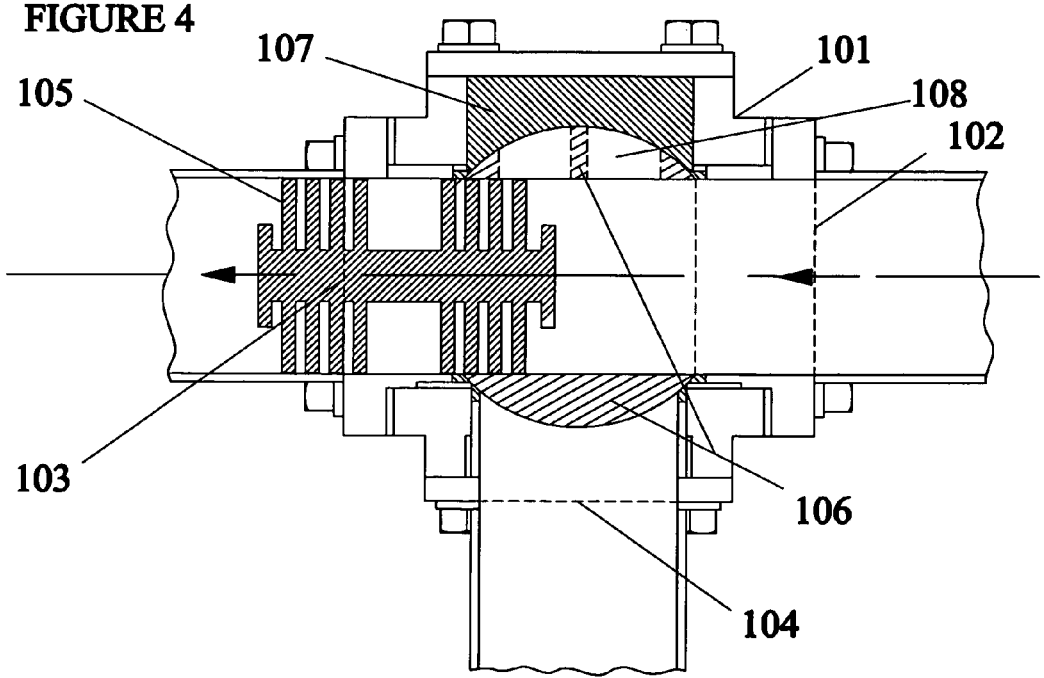
FIG. 4 is a cross sectional view of the invention along the line 24—24.

FIG. 4 is a sectional view of the invention looking at the lower half of the invention from the top. The customized valve ball 106 inside the valve body 101 is set in the "through" flow position with the machined holes 108, which comprise the branch path through the ball, shown rotated to a position opposite the branch port 104. In this position, the machined holes 108 in the ball 106 are sealed by the inert cavity filler 107, and the branch port 104 is blocked. Flow is depicted with arrows as entering the main line port 102, and leaving main line port 103. Portions of upstream piping connected the main line port 102, downstream piping connected to the main line port 103, and branch piping connected to the branch port 104 are shown in outline form for clarity. A pig 105 is shown as having moved through the valve body 101, and now entering the downstream piping connected to the mail line port 103.

Figure 5:
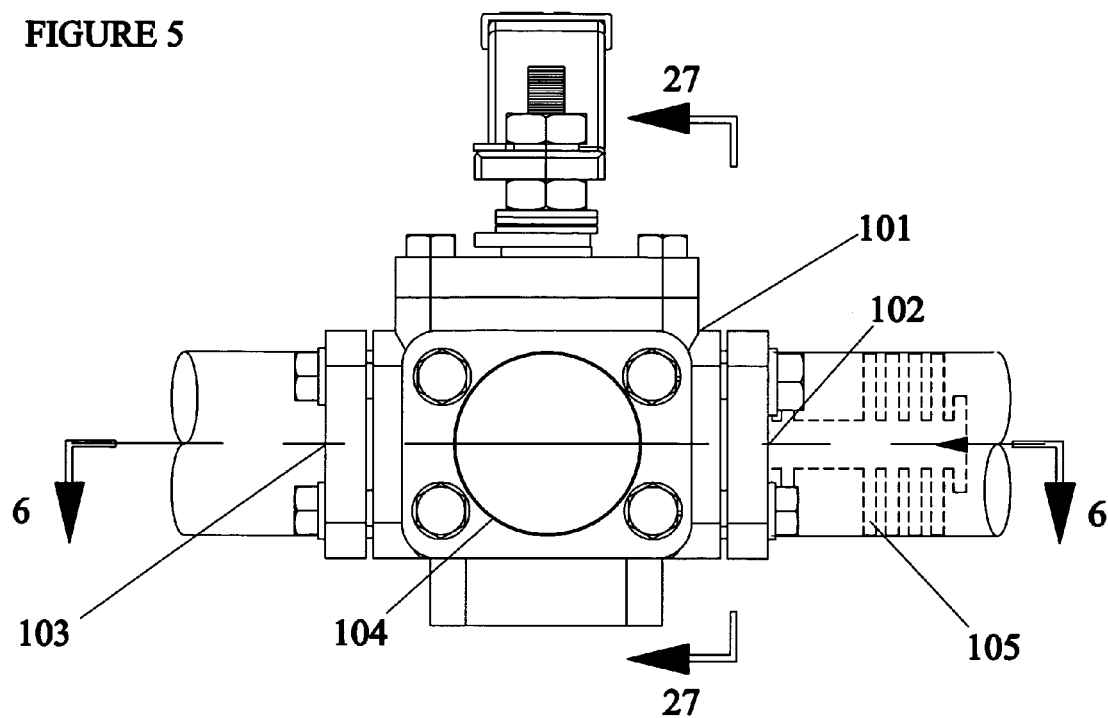
FIG. 5 is an elevation view of the invention set in the "branch" flow position, looking into the branch port.

FIG. 5 is an elevation view of the invention looking directly into the branch port 104 and showing the valve body 101 with the valve set in the "branch" flow position. Flow is depicted with an arrow as entering the main line port 102, and would then leave the valve body through the branch port 104, with the mainline port 103 blocked. Portions of upstream piping connected to the main line port 102 and downstream piping connected to the main line port 103 are shown in outline form for clarity. A portion of a pig 105 is shown as entering the valve body from upstream piping connected to the port 102.

Figure 6:
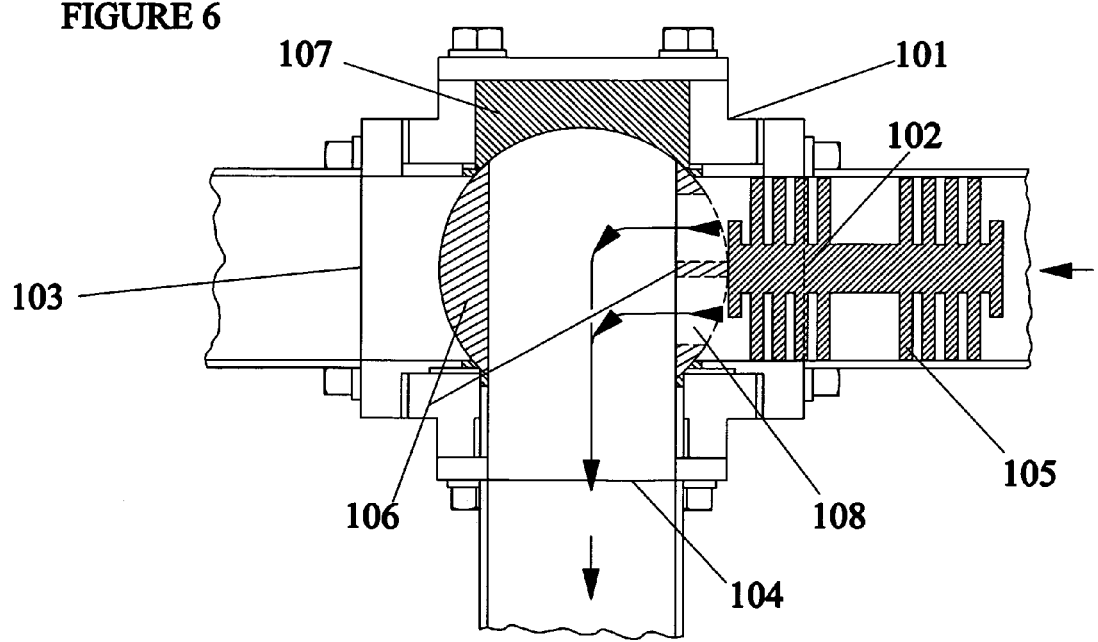
FIG. 6 is a cross sectional view of the invention along the line 26—26.

FIG. 6 is a sectional of the invention looking at the lower half of the invention from the top. The customized valve ball 106 inside the valve body 101 is set in the "branch" flow position with the machined holes 108, which comprise the branch path through the ball, shown rotated to align with the main line port 102. In this position, the machined holes 108 in the ball 106 allow flow, depicted with arrows, to enter the valve body from the main line port 102 and then leave the valve body 101 through the branch port 104. The inert cavity filler 107 completes the seal between the ball 106 and the valve body 101; the main line port 103 is blocked. Portions of upstream piping connected the main line port 102, downstream piping connected to the main line port 103, and branch piping connected to the branch port 104 are shown in outline form for clarity. A pig 105 is shown as having moved into the valve body 101 from the upstream piping connected to the main line port 102, and stopped by the material left between the machined holes 108 in the customized ball 106.

Figure 7:
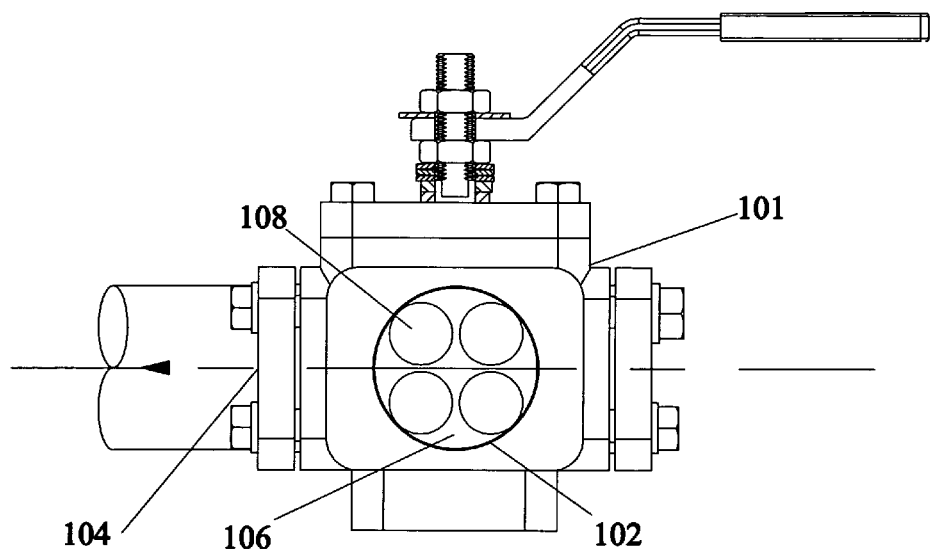
FIG. 7 is a cross sectional view of the invention along the line 27—27.

FIG. 7 is a sectional view of the invention looking directly into the main line port 102 from the direction of the upstream piping connected to the main line port 102. The customized valve ball 106 inside the valve body 101 is set in the "branch" flow position with the machined holes 108, which comprise the branch path through the ball, shown rotated to align with the main line port 102. In this position, the machined holes 108 in the ball 106 are clearly visible and flow is depicted with an arrow as leaving the valve body 101 from the branch port 104. A portion of the branch piping connected to the branch port 104 is shown in outline form for clarity.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A multi-port valve device which can operate in a plurality of predetermined positions which include at least one position that will allow unobstructed flow of a fluid and movement of line-clearing devices selected from the group consisting of pigs, spheres, scrapers, swabs, squeegees, cylinders, and balls through said device, and at least one alternate position which will divert flow of a fluid through said device to a branch port and simultaneously present an in-line barrier to control the movement of a said line-clearing devices comprising;
   a) a multi-port valve body with at least three ports in the same plane;
   b) a rotating core member to control flow direction through said valve body comprising; at least one unobstructed flow path through said member and at least one branch flow path through said member which can divert flow of a fluid through said member and incorporates a partial obstruction to control the movement of said line-clearing devices; and
   c) a means to rotate said core member about an axis perpendicular to said plane whereby said paths through said core member can be made to align with predetermined ports of said valve body.

2. A device according to claim 1 wherein said rotating core member is a ball element from a full-port two-way ball valve, which has been custom-machined to include a plurality of holes, appropriately sized and disposed, to create said branch path incorporating said partial obstruction.

3. A device according to claim 1 wherein said partial obstruction in the branch flow path is made by installing a physical barrier inside the branch port of a commercially available T-port ball element.

4. A device according to claim 3 wherein said barrier is a steel rod of suitable diameter welded inside and across the diameter of said branch port, such that the outermost surface of the rod is flush with the outside diameter of the ball.

5. A device according to claim 3 wherein said barrier is a steel bar, of suitable dimension, welded inside and across the diameter of said branch port, and shaped such that the outside surface along the length of said bar is curved to match the outside radius of said ball, and welded in place such that the curved surface of said bar forms a continuation of the surface of said ball across the diameter of said branch port.

6. A device according to claim 1 wherein said rotating core member is of a plug or cylindrical shape.

7. A device according to claim 1 wherein said rotating core member can rotate 90 degrees to allow flow from a branch port to and from the upstream section of the main line or 180 degrees to allow flow from the branch to and from either the upstream or downstream portions of the main line.

8. A device according to claim 1 wherein the means to rotate said core member is shaft connected to a manual lever.

9. A device according to claim 1 wherein the means to rotate said core member is shaft connected to a powered valve actuator.

* * * * *